United States Patent [19]
Shiina et al.

[11] Patent Number: 5,274,750
[45] Date of Patent: Dec. 28, 1993

[54] ROBOT TEACHING APPARATUS AND METHOD WITH SKILL LEVEL STORAGE

[75] Inventors: Tsukasa Shiina, Narashino; Kazuyoshi Teramoto, Matsudo; Masao Oura, Yachiyo; Raiji Shimomura, Sakura, all of Japan

[73] Assignees: Hitachi, Ltd., Tokyo; Hitachi Keiyo Engineering Co., Ltd., Chiba, both of Japan

[21] Appl. No.: 649,986

[22] Filed: Feb. 4, 1991

[30] Foreign Application Priority Data

Feb. 21, 1990 [JP] Japan .................................. 2-38451

[51] Int. Cl.5 .............................................. G06F 3/00
[52] U.S. Cl. .................. 395/99; 364/474.23; 364/474.25; 901/3
[58] Field of Search ............... 395/99; 364/474.23, 364/474.24, 474.25; 901/3, 4, 5

[56] References Cited

U.S. PATENT DOCUMENTS

| | | | |
|---|---|---|---|
| 4,146,924 | 3/1979 | Birk et al. ........................... | 395/99 |
| 4,152,765 | 5/1979 | Weber ................................ | 364/474.25 |
| 4,379,335 | 4/1983 | Kirsch et al. ...................... | 395/99 |
| 4,445,182 | 4/1984 | Morita et al. ...................... | 364/474.25 |
| 4,490,781 | 12/1984 | Kishi et al. ........................ | 364/474.25 |
| 4,603,285 | 7/1986 | Matsuura et al. ................. | 364/474.23 |
| 4,700,118 | 10/1987 | Kishi et al. ........................ | 395/99 |
| 4,757,459 | 7/1988 | Lauchnor et al. ................. | 395/99 |
| 4,788,636 | 11/1988 | Shiratori et al. .................. | 364/474.23 |
| 4,831,549 | 5/1989 | Red et al. .......................... | 395/89 |
| 4,837,734 | 6/1989 | Ichikawa et al. .................. | 395/84 |
| 4,888,708 | 12/1989 | Brantmark et al. ............... | 395/99 |
| 4,901,220 | 2/1990 | Matsumura et al. .............. | 364/474.26 |
| 5,146,402 | 9/1992 | Seki et al. .......................... | 364/474.26 |

OTHER PUBLICATIONS

*Robot Control M, ein neues Steuerungskonzept fur Handhabungssysteme,* Siemens-Energietechnik 3 (1981) Heft 8/9, pp. 285–289.

*Primary Examiner*—Allen R. MacDonald
*Attorney, Agent, or Firm*—Antonelli, Terry, Stout & Kraus

[57] ABSTRACT

In accordance with levels of skillfulness of operators, guidance of a robot teaching apparatus is automatically changed for facilitated use by beginners and skilled operators. Teaching is performed through an interactive procedure with the aid of a display of message for manipulation guidance and a menu for input selection. A key manipulation path is automatically determined on the basis of various experience factors. For a skilled operator, operation up to generation of a final function display is executed in an automated manner.

5 Claims, 13 Drawing Sheets

ROBOT TEACHING APPARATUS AND METHOD WITH SKILL LEVEL STORAGE

BACKGROUND OF THE INVENTION

The present invention relates generally to an industrial robot of a teaching/playback type and more particularly to a teaching method and a teaching apparatus for an industrial robot such as a welding robot the operation of which requires various and numerous items to be taught.

Heretofore, the robot of the teaching/playback type has occupied a major proportion of the industrial robots such as welding robots. In recent years, however, the industrial robot has been utilized in a wide variety of applications, and has been accompanied by an increase in the number and the type of the functions to be imparted to the robot. In contrast a, requirement for miniaturization is imposed on the teaching apparatus (also referred to as the teaching box or manipulation box) used in association with the robot, and an effort is being made to suppress as far as possible the number of keys and switches to be installed in the teaching apparatus. As a consequence, the teaching apparatus tends to be implemented in a single-key multiple-function configuration.

Under the circumstances, as an approach for coping with the complicated teaching procedure resulting from the single-key multi-function implementation of the miniaturized teaching apparatus, there has already been proposed the use of a large size liquid crystal display or displaying messages for guiding manipulation of the teaching apparatus in combination with a menu select input facility for executing the displayed manipulation procedure so that even the beginner can effect teaching the robot system, as disclosed, for example, in JP-A-H1-92080 and JP-A-H1-92823.

On the other hand, as a teaching apparatus which is oriented for the skilled users, there have been proposed and developed the teaching apparatuses of type-ahead scheme, direct access scheme or menu macro scheme which can comply with the user's requests in detail, as discussed, for example, in Ben Schneiderman's "designs of User Interface" published by Nikkei McGraw-Hill Co. ltd..

However, in the hitherto known teaching apparatuses mentioned above, no consideration is paid to the possibility of common use of one and the same teaching apparatus by those differing from one another in respect to the experience and the level of skill such as beginners and skilled users. Accordingly, although the interactive type teaching apparatus implemented as based on the combination of manipulation guidance message and menu select input facility is very favorable for the beginner, the skilled operators are confronted with a troublesome procedure adapted for the beginner because detailed guidance is presented even for the procedure with which the skilled operators are very familiar. Accordingly, with this teaching apparatus, the skill of the user can not be taken advantage of but much time is consumed wastefully in following the procedure for the beginner. On the other hand, the type ahead, direct access or the menu macro type teaching apparatuses known heretofore can scarcely be used by the beginners to any satisfactory extent. The industrial robot, once installed, is used for the same dedicated operation or work with a result that teaching of same contents is performed repeatedly for the installed robot in most of applications thereof. A relatively great number of key manipulations are required, taking much time and presenting uncomfortableness as well as fatigue of the fingers.

SUMMARY OF THE INVENTION

Accordingly, it is an object of the present invention to provide a method of teaching an industrial robot used for a specific work or operation which method allows an aimed particular guidance (final guidance) to be reached through a simplified procedure. With the present invention, it is also contemplated to provide a teaching apparatus for carrying out the method as well as an industrial robot incorporating such teaching apparatus.

Another object of the present invention is to provide robot teaching method and apparatus which allow sufficient guidance information to be available for the beginner while allowing only necessary and simplified guidance to be available for the skilled operator in dependence on the levels of skillfulness through a simplified procedure without need for any special operation or manipulation. The invention can be provided in an industrial robot incorporating the teaching apparatus mentioned above.

In view of the above and other objects which will be more apparent as description proceeds, it is proposed according to an aspect of the present invention that the key manipulation paths executed in the past, inclusive of the manipulation path executed immediately precedingly, are analyzed for extracting the manipulation path executed immediately precedingly or most frequently to thereby allow a procedure leading to the generation of the final manipulation guidance indication to be executed immediately upon actuation of a key for realizing a goal function.

Further, it is proposed according to another aspect of the invention in view of the second mentioned object to provide decision means for making decision as to which of the preceding manipulation path or the most frequently executed path or decision means for deciding whether the user is a beginner or a skilled operator so that the teaching apparatus can be used in different manners as desired by the users.

According to the teachings of the present invention, manipulation of the teaching apparatus can be simplified while the goal function can rapidly be realized. Further, for the beginner, the manipulation guidance indication presenting correspondingly detailed indications can be displayed, while for the skilled operator, the guidance indication is simplified or partially spared in accordance with the level of his or her skillfulness. In this manner, manipulation guidance indications to both the beginners and the skilled users can be made available.

DESCRIPTION OF THE EMBODIMENTS

Figure 1:
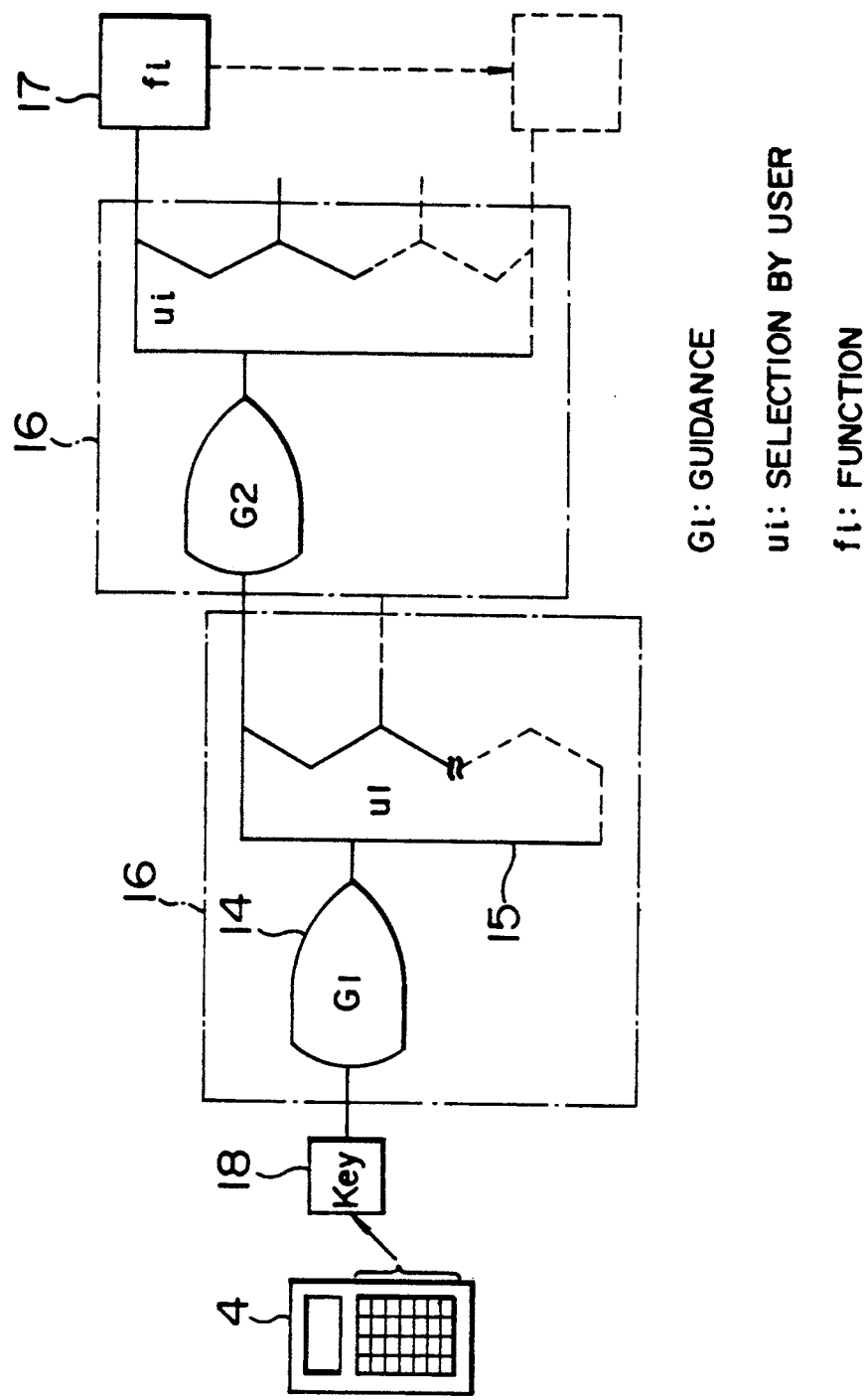
FIG. 1 is a schematic block diagram showing a general arrangement of a teaching apparatus according to an exemplary embodiment of the invention.

Teaching of an industrial robot is executed by following a particular key manipulation path for each of goal functions, operations or actions (i.e. the goals which the user desires to be executed by the robot) by using a teaching apparatus. The phrase "manipulation path", refers to a permutation or series of manipulation joining points which are realized through guidance manipulation control and menu selection control procedure, an example of which is illustrated in FIG. 1. More specifically, referring to the figure, a man-machine interface of a programming unit 4 constituting a part of the teaching apparatus is shown together with a flow for realizing a particular goal function 17 which represents the final goal. As can be seen in FIG. 1, arrangement is made such that processings for a plurality of manipulation joining points 16 have to be executed for attaining the particular function 17 aimed as the final goal.

As is shown in FIG. 1, the plurality of manipulation joining points 16 are each realized by a guidance indication 14 and a user's selection 15, wherein the processing to this end can proceed as the user selects one of branches in the user's selection 15 by means of keys 18 while viewing a display of the indication 14. When the particular function 17 aimed ultimately is obtained, this means that a particular key manipulation path has been selected from a plurality of key manipulation paths. At that time, the number of the manipulation joining points 16 as well as the content of the indication 14 and that of the user selection are so implemented as to be oriented for a beginner.

In other words, until the goal function has been reached, scrupulous guidance indications are given so that even the beginner can manipulate facilely. Consequently, for those skilled in manipulating the teaching apparatus, the guidance is too excessive and extraneous for a smooth manipulation or operation.

Figure 2:
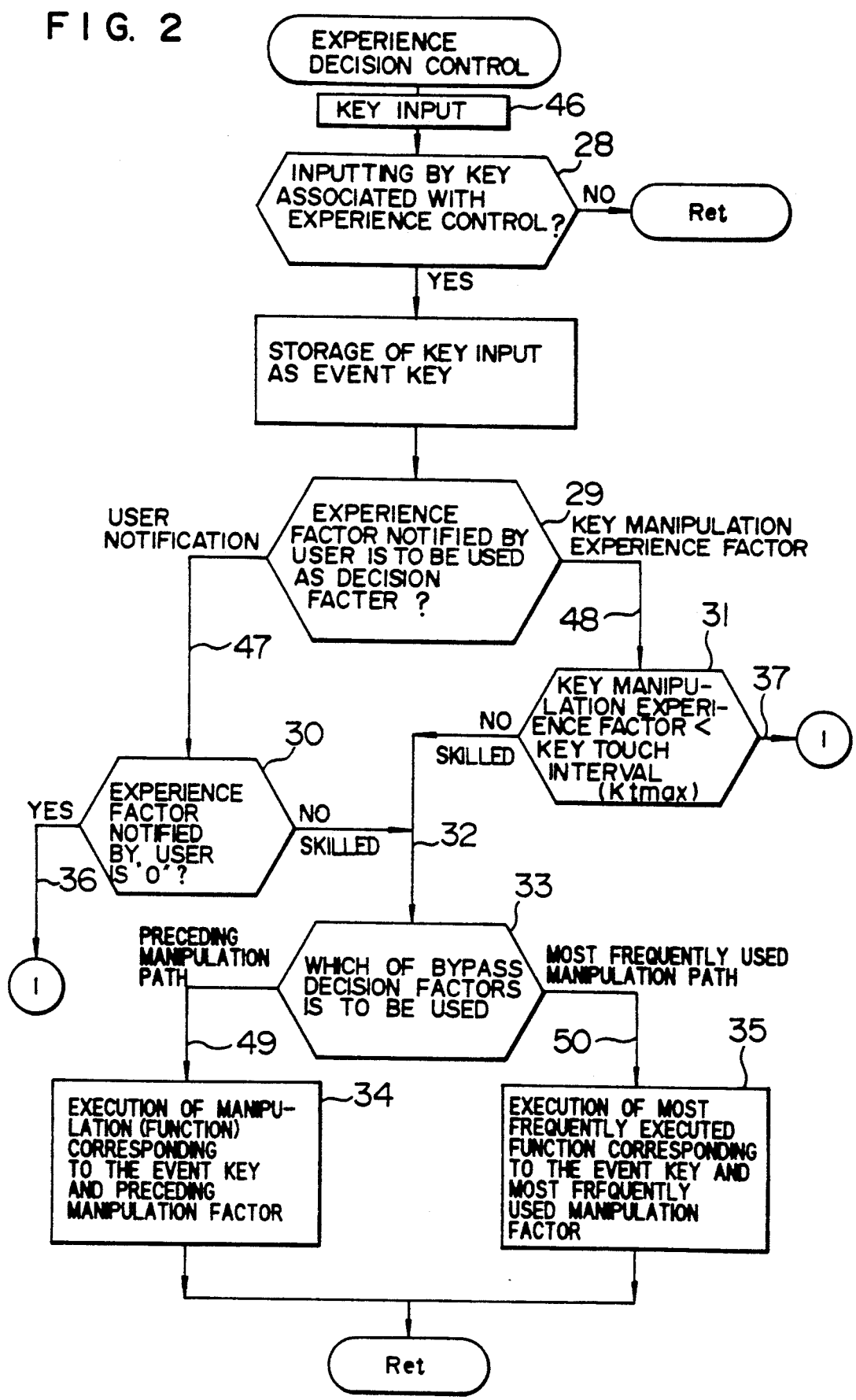
FIG. 2 is a flow chart for illustrating a experience decision control taught by the present invention.

Under the circumstance, according to the teachings of the invention in a preferred embodiment thereof, the indication for teaching the robot is controlled as to be correspondingly simplified by adopting an experience decision control procedure illustrated in FIG. 2. A control apparatus for performing the experience decision control procedure shown in FIG. 2 may be incorporated in the teaching apparatus or in an industrial robot.

According to the experience decision control processing flow shown in FIG. 2, the teaching apparatus can make decision as to whether a user manipulating currently the teaching apparatus is a beginner or a skilled operator, wherein upon decision of the skilled person, a procedure for simplifying the guidance indication display can be selected. Thus, according to the processing flow shown in FIG. 2, determination of whether the user is a beginner or a skilled person can be selectively validated, as will be described in detail below.

In the first place, it is decided at a processing step 28, whether an actuated input key step (46) is the one to be subjected to the decision or not. More specifically, there exist in the teaching apparatus those keys assigned with the objectives and the functions and those unassigned. Further, some of the keys are assigned with only one type of the objective or function, while some of them are each assigned with more than one objectives or functions. Such being the circumstances, it is proposed to impart attributes to the key for facilitating the decision as to whether the input key is the one imparted with a single function. When the result of the decision made at the step 28 is affirmative (YES), then the key is stored or memorized as an event key. On the other hand, when the result of the decision is negative (NO), return is made to the start.

At a processing step 29, decision is made on the basis of decision factors set up in a parameter setting processing part which will be described later on whether a factor notified or declared by the user (referred to as user-notified experience factor path 47) or alternatively a factor based on experience of the key manipulation (referred to as the key manipulation experience factor path 48) is to be used as the information for determining the level of skillfulness of the operator in the subsequent processings.

At processing steps 30 and 31, decision is made as to whether the level of skillfulness of operator is that of the beginner or that of the skilled operator. In the latter case, the processing proceeds to a step 32.

Figure 10:
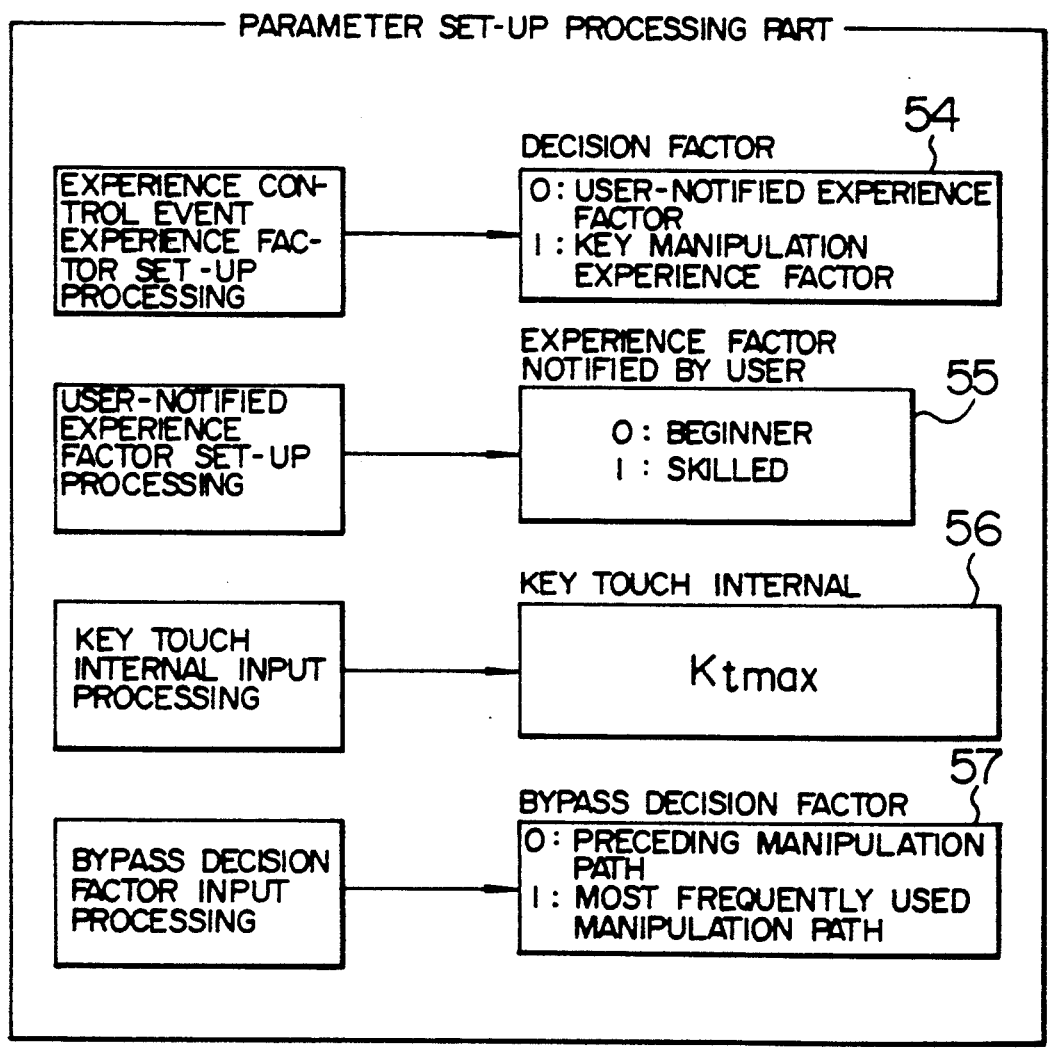
FIG. 10 is a schematic diagram for illustrating a parameter set-up processing function.

At a processing step 33, decision is made as to whether determination of the goal or final function is to be based on a preceding manipulation path experience factor (i.e. the factor indicating the precedingly executed manipulation path 49) or alternatively a most frequently executed manipulation path experience factor (i.e. the factor indicating the manipulation path 50 executed most frequently). As the information to this end, a bypass decision factor set up by the user in the parameter set-up processing part (FIG. 10) described hereinafter is used.

On the basis of the result of the decision made at the processing step 33, one of processing steps 34 and 35 is selected, whereby an aimed function is instantly made available without need for the guidance and user selecting operation, which means that the machine interface for the facilitated use by the skilled person is realized.

On the other hand, when the processing proceeds to flows 36, 37 from the step 30 or 31, decision is made such that the operator is a beginner. In this case, the processing proceeds to a flow illustrated in FIG. 3, whereon processing illustrated in FIG. 4 is activated at a processing step 38.

According to the processing shown in FIG. 4, an average of key touch time intervals intervening between the successive actuations or depressions of the keys is measured or determined in response to a corresponding activation request, whereon processing described hereinafter is performed for every relevant event key by utilizing the result of the above measurement as the experience key manipulation factor 56, which is used in executing the processing 31 shown in FIG. 2, as described hereinbefore.

Figure 3:
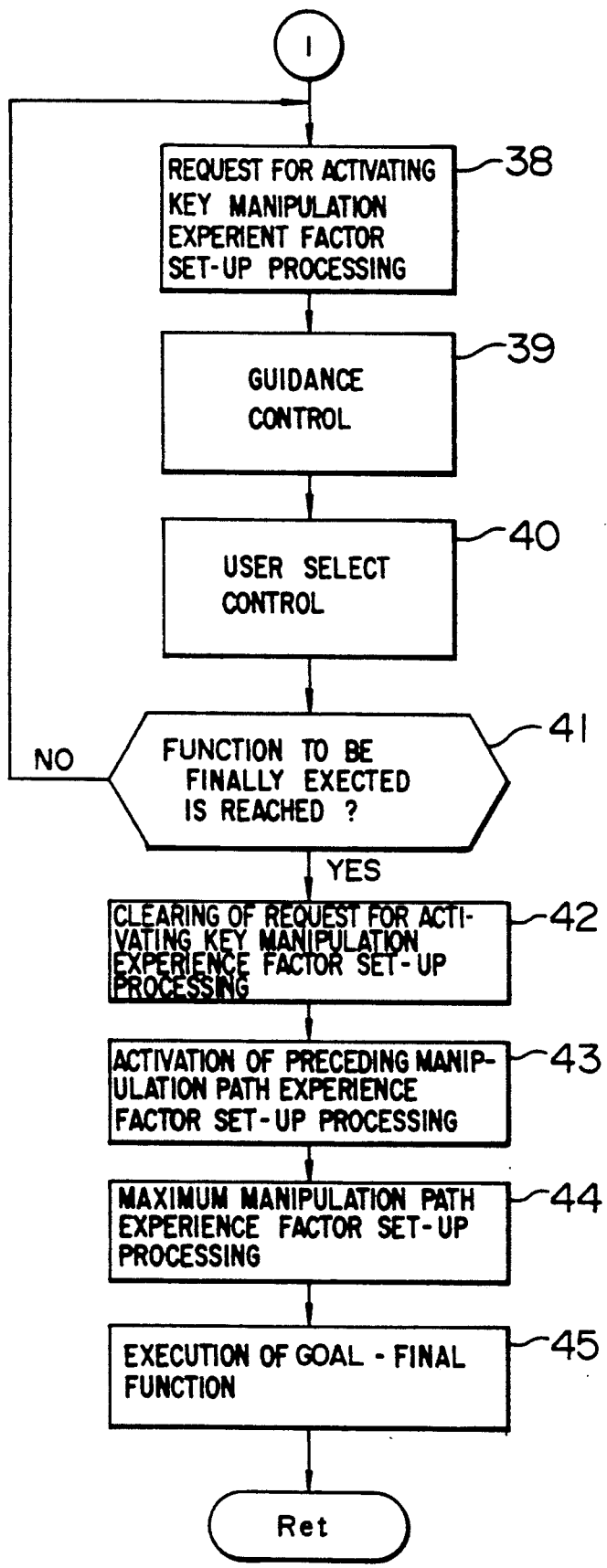
FIG. 3 is a flow chart illustrating a man-machine interface processing for a beginner user.
Figure 4:
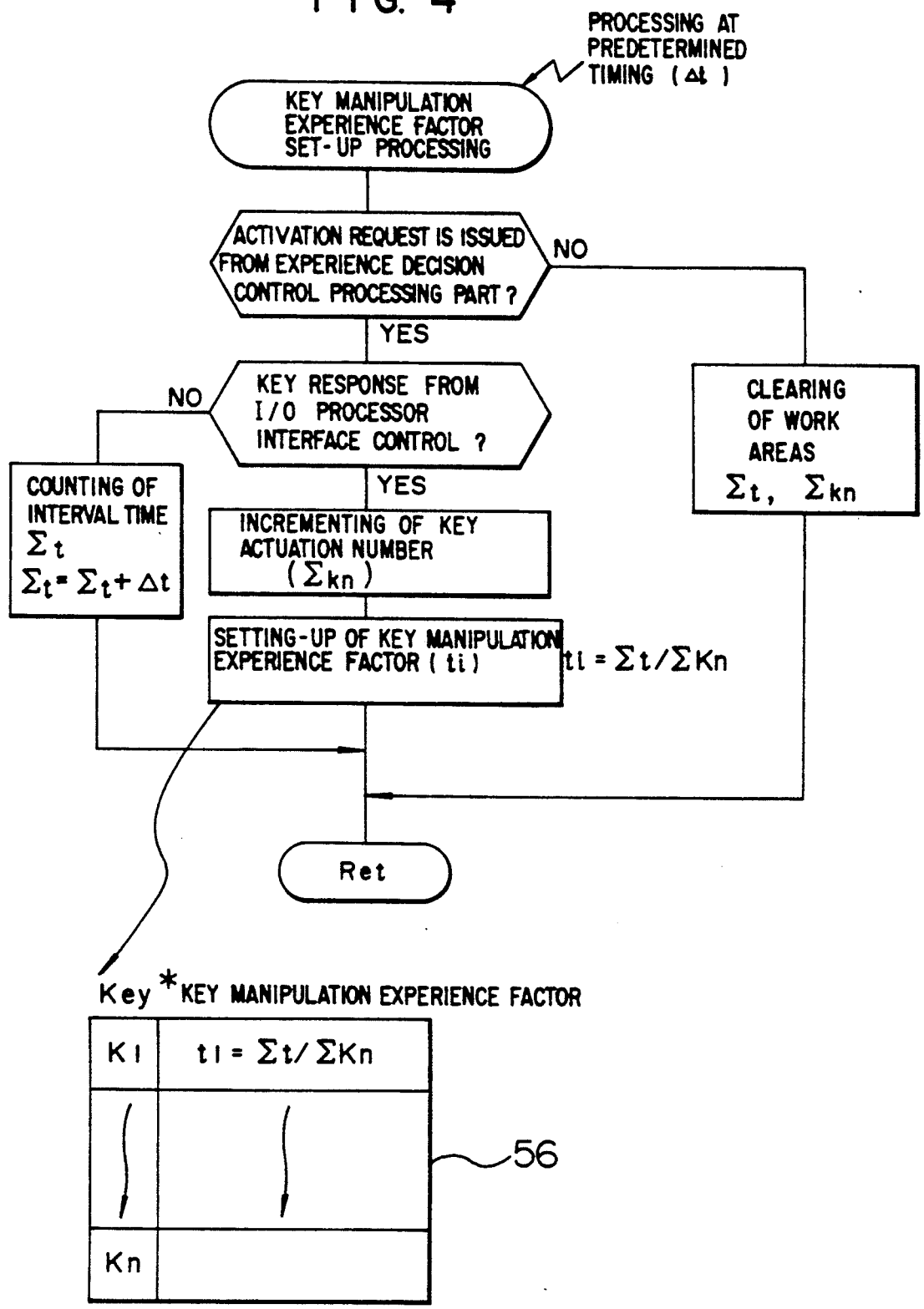
FIG. 4 is a flow chart for illustrating a key manipulation experience factor set-up processing.
Figure 5:
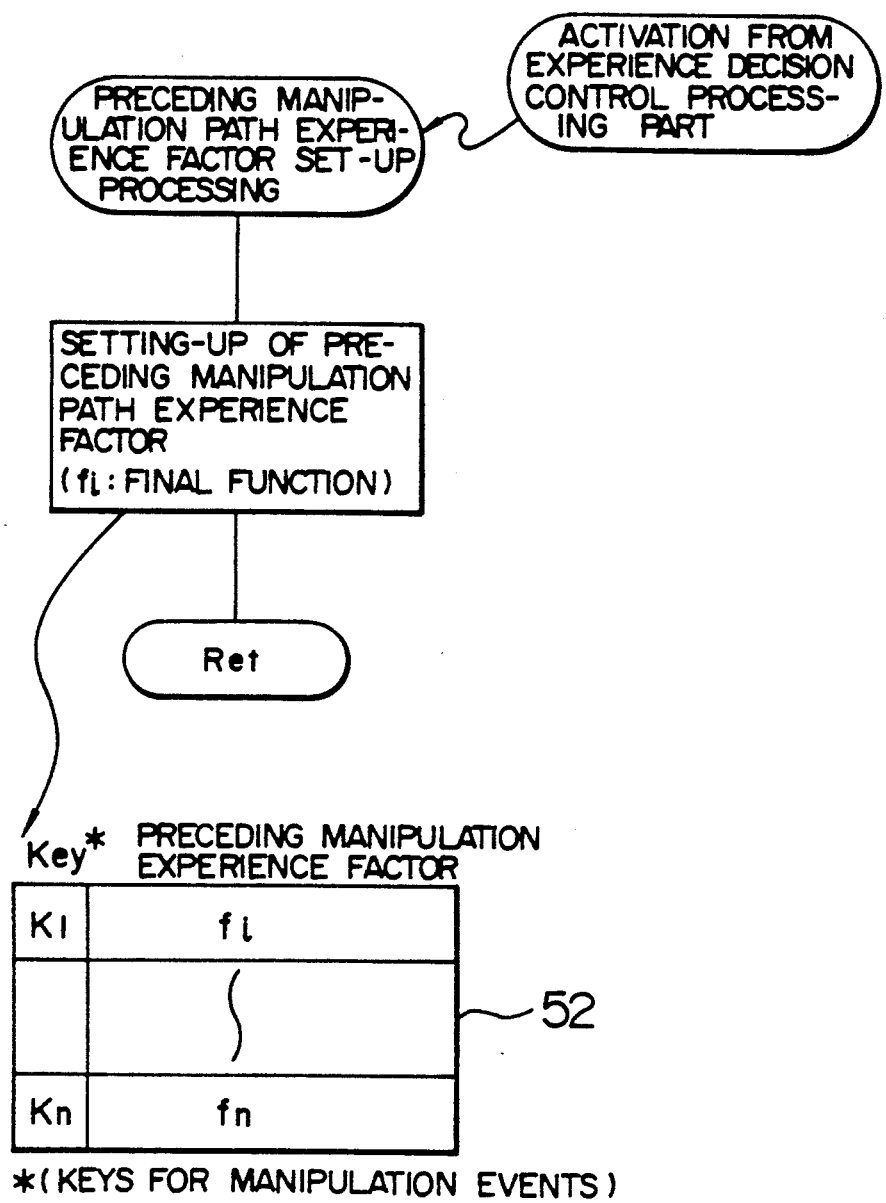
FIG. 5 is a flow chart for illustrating a preceding key manipulation experience factor set-up processing.
Figure 6:
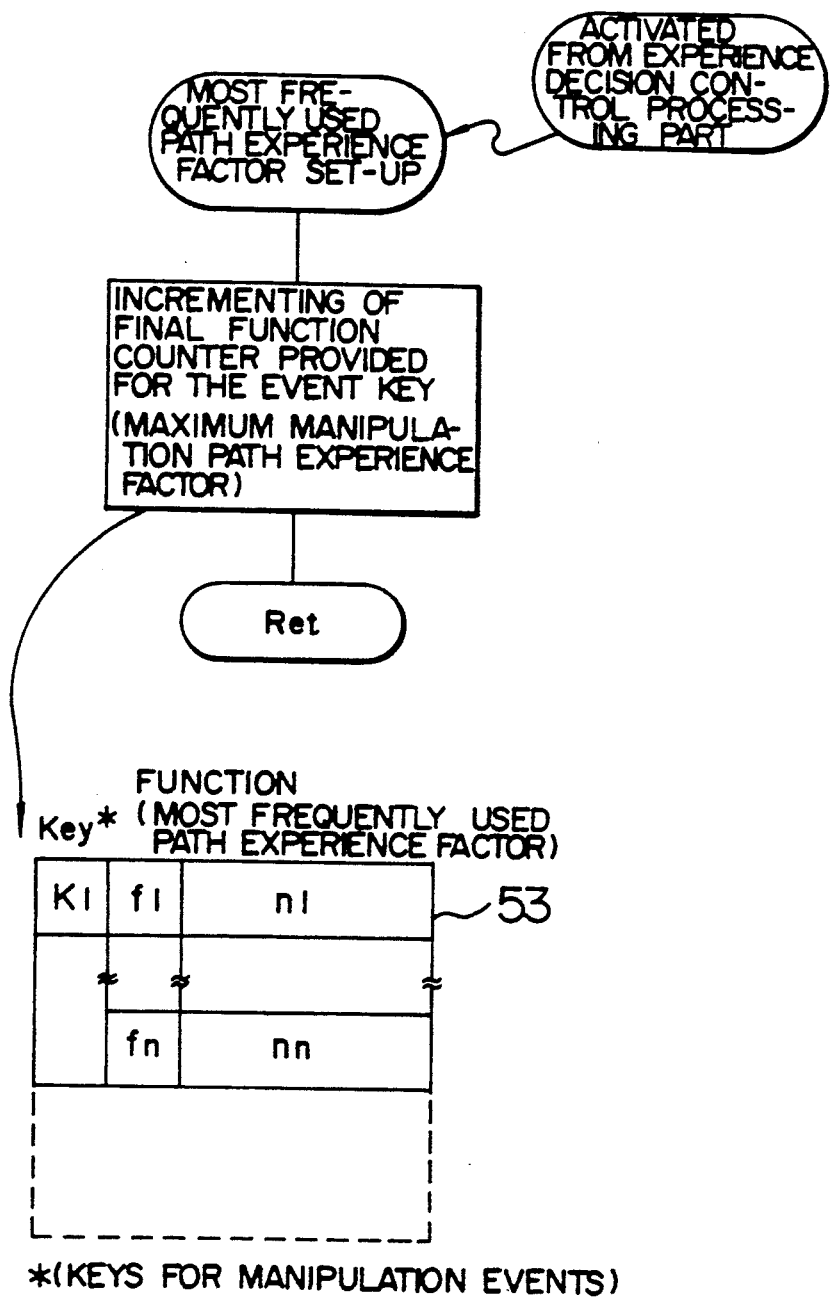
FIG. 6 is a flow chart for illustrating a most frequently executed manipulation path experience factor set-up processing.

Now turning back to FIG. 3, ordinary processing required for the machine interface control for the beginner (the processing for the beginner described hereinbefore by reference to FIG. 1) is performed at processing steps 39 to 41, whereon the activation request for the processing shown in FIG. 4 is cleared at a step 42, which is then followed by execution of a processing step 43 for activating the processing shown in FIG. 5, before the finally aimed function is realized at a processing step 45. In the processing shown in FIG. 5, the manipulation paths executed precedingly are stored for every goal function manipulating path corresponding to the individual event keys (K1, ..., Kn). More specifically, there is executed the processing for storing the codes, numbers or the like (f1, ..., fn) assigned to the goal functions as the preceding manipulation path experience factors 52. Further, at the processing step 44, processing shown in FIG. 6 is activated. In the processing shown in FIG. 6, the number of times (n1, ..., nn) the functions (f1, ..., fn) imparted to the event keys have been executed is measured or determined, whereon the maximum one of the factors 53 as determined is used in the processing 35 (FIG. 2) as the most frequently executed manipulation path experience factor.

In this manner, through the processing shown in FIG. 3, the machine interface oriented for the beginner can be realized.

As will be understood from the above description, by virtue of the processing according to a preferred embodiment of the invention shown in FIG. 2, the contents of the man-machine interface for the robot teaching apparatus can be changed automatically in dependence on the levels of skillfulness from that of the beginner to the skilled user in accordance with the degree of his or her experience in the manipulation of the apparatus. Thus, there is provided the teaching apparatus which can always sufficiently ensure satisfaction of any user and which can enhance significantly the user-friendliness of the man-machine interface of the robot. Further, owing to the experience control function, change of the content of the man-machine interface can be implemented in an automated manner. Thus, there arises no necessity to exchange relevant systems upon changing of the contents of the man-machine interface, differing from the prior art teaching apparatus. Consequently, extraneous labor otherwise required can be spared, to a great advantage.

The experience factors mentioned above are not limited to those having respective definite implications. Thus, differences in respect to the demands and the degrees of experience of the users can be coped with in a flexible manner. It should further be mentioned that the processing flow shown in FIG. 2 can be executed effectively even when some steps involved in the processing are spared. For example, either one of the processing steps 34 and 35 may be employed. In that case, the processing step 33 will also be rendered unnecessary.

In consideration of the fact that most of the industrial robots once installed are so manipulated that one and the same operation is performed repeated, it is preferred from the stand point of procedure simplification that one path for performing a particular operation is automatically established independent of the beginner or the skilled person with the intermediate guidance being omitted. To this end, the processing steps 33, 34 and 35 may be used (with the steps 28 to 31 being omitted). Further simplification can be realized by using only the processing step 34 or 35 (with the step 33 being also spared).

According to the versions of the processing shown in FIG. 2 in which some of the processing steps are spared as mentioned above, there can be obtained additional advantageous effect with regard to the storage capacity required for the processing owing to the simplifications described above.

Now, description will be directed to a concrete system structure for carrying out the present invention, only by way of example.

Figure 7:
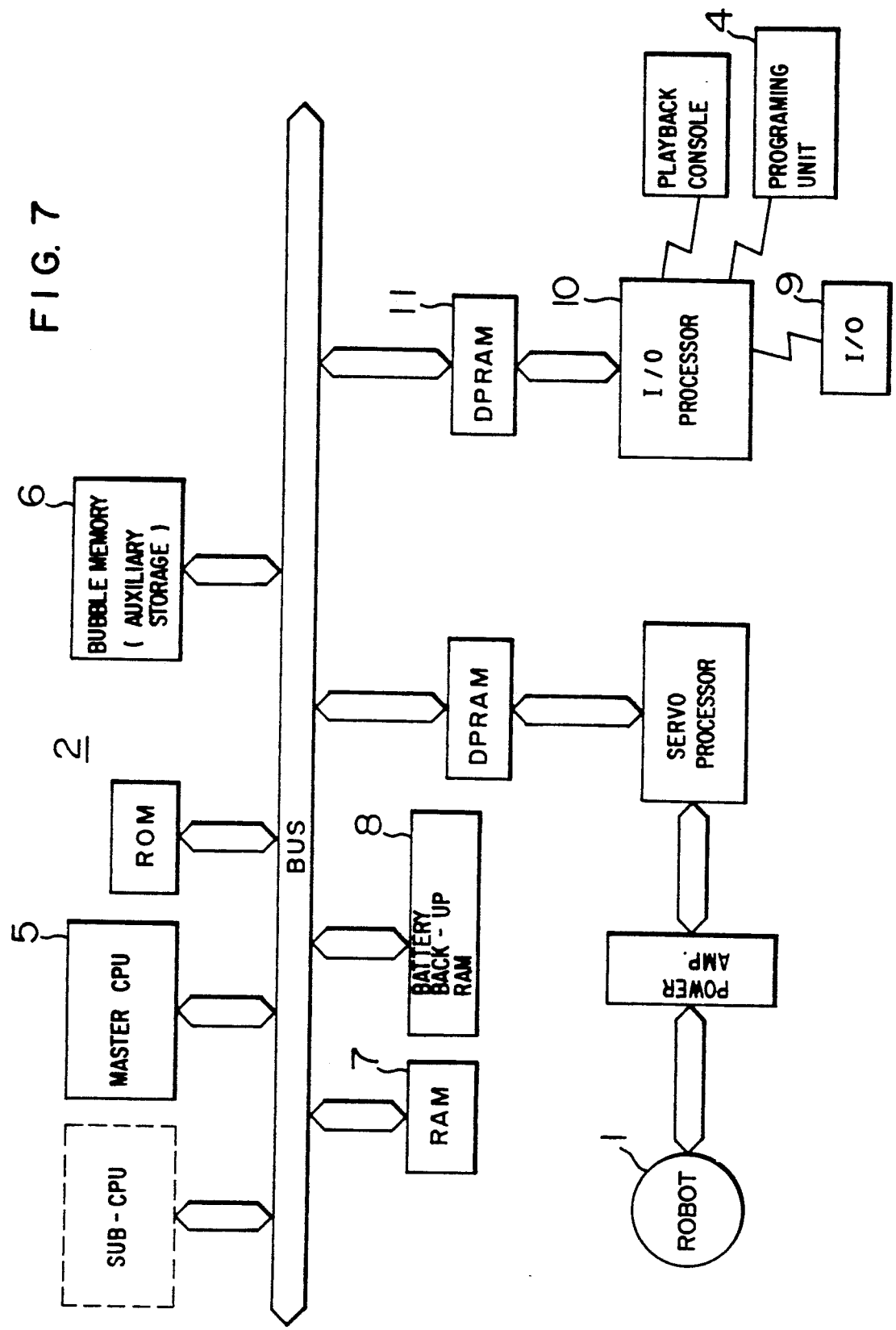
FIG. 7 is a schematic block diagram showing a hardware structure of a robot controller according to an embodiment of the invention.

FIG. 7 shows a system hardware structure of a robot controller 2 according to an embodiment of the invention.

Referring to FIG. 7, software containing algorithm relevant to the instant embodiment is stored in a bubble memory 6 constituting an auxiliary storage unit of the system under consideration, wherein the software is executed by a master central processing unit (CPU) 5 with the aid of a random access memory (RAM) 7 upon activation of the system. Transaction or transfer of information between the master CPU 5 and a programming unit 4 is performed by way of a dual-port RAM 11 under the control of an input/output (I/O) processor 10.

A reference numeral 8 denotes a battery backed-up RAM which is destined for storing the experience factors, user set-up data or the like which will be described hereinafter. The data stored in this RAM 8 can be held even in the power-off state. A robot 1 is connected to the master CPU 5 and others via a DRAM (dynamic random access memory) 11, a servo-processor, a power amplifier and others to be thereby controlled in operation.

Figure 8:
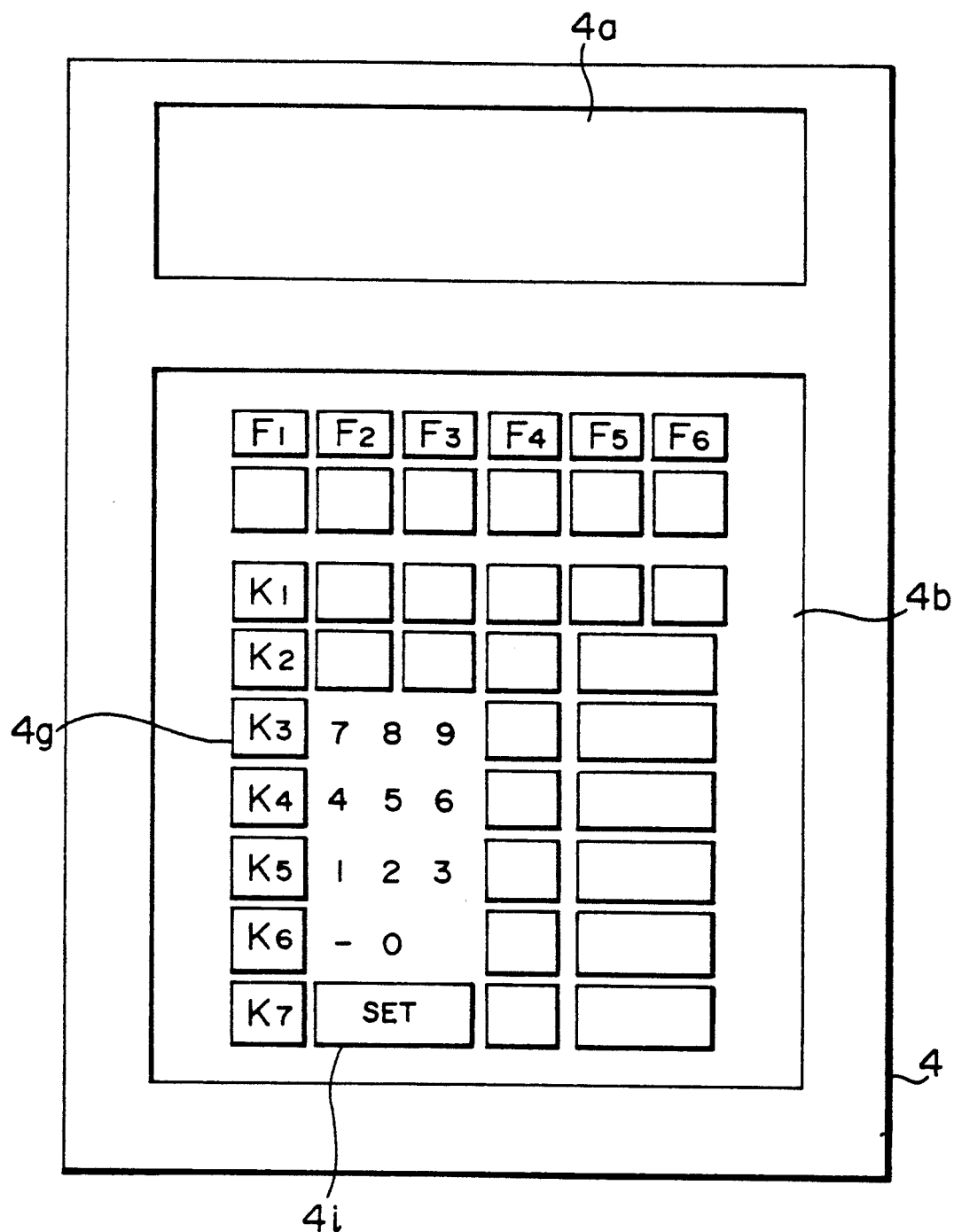
FIG. 8 is a front view showing a teaching apparatus according to an embodiment of the invention.

FIG. 8 shows a concrete example of the programming unit 4 shown in FIG. 7, which represents a typical one of the teaching apparatus. In FIG. 8, a reference symbol 4a denotes a display field for displaying data to be taught, guidance for manipulation, messages and others. A numeral 4b denotes a keyboard which includes a variety of switches required for teaching the robot. Among them, there should be mentioned a plurality of event keys 4g and a set key 4i for setting up the key input. Of course, the programming unit 4 incorporates circuits for controlling the display 4a, the keyboard 4b and others. However, these circuits are omitted from illustration because they have no direct relation to the system now under consideration. (For more particulars of the programming unit 4, reference may be made to JP-A-H1-92080).

This programming unit 4 is also referred to as the teaching box or manipulation box.

With the aid of the programming unit 4, the key operation for executing various teachings to the robot mentioned above is performed.

Figure 9:
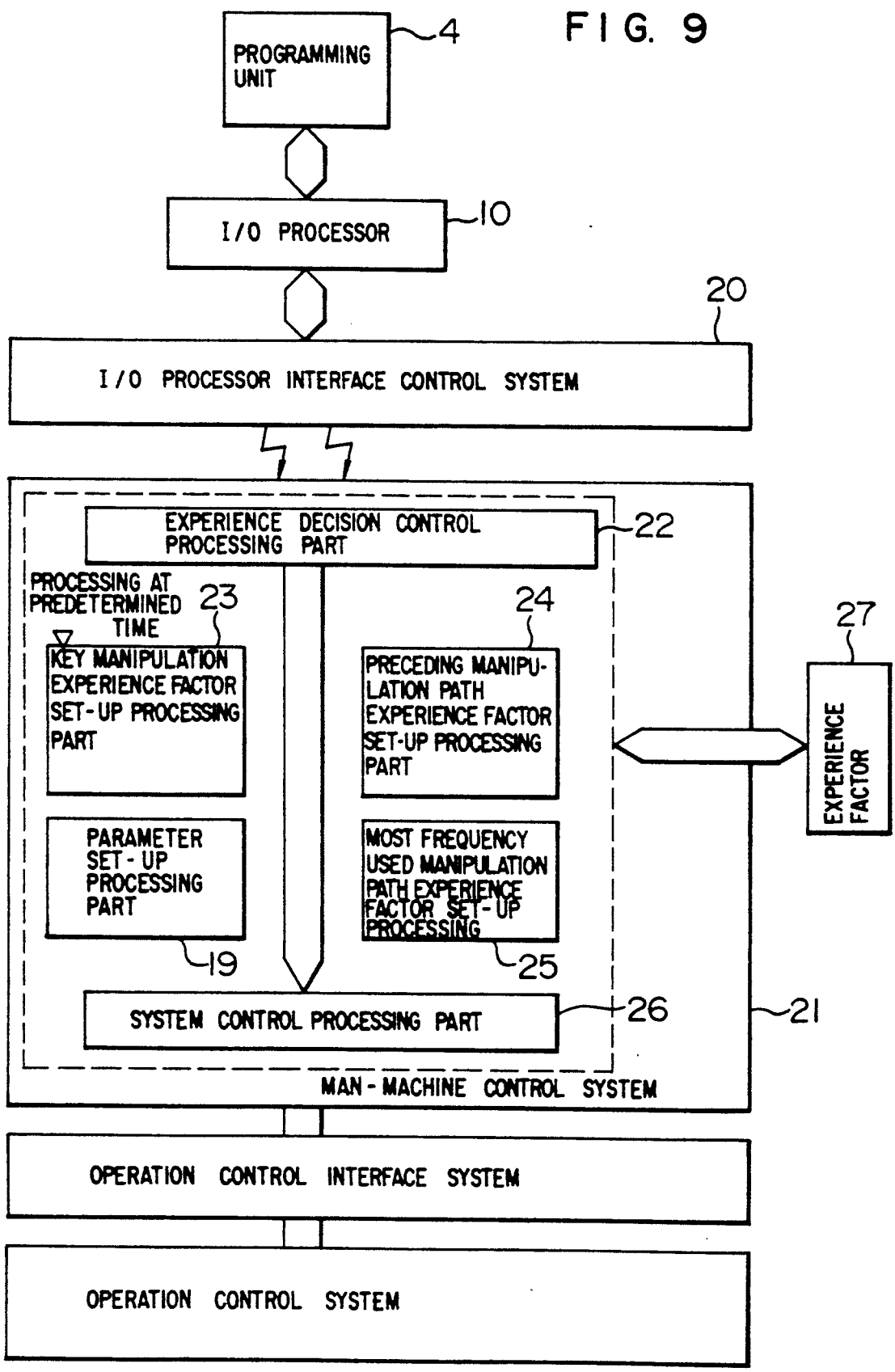
FIG. 9 is a functional block diagram for illustrating a processing taught by the invention.

FIG. 9 is a functional block diagram for illustrating the processings executed in carrying out the present invention.

Referring to FIG. 9, a man-machine control system 21 is connected to the programming unit 4 via an I/O processor 10 and an I/O processor interface control system 20, wherein various data are inputted through key manipulation. An operation control system inclusive of the robot body is connected to the man-machine control system 21 by way of an operation control interface system to be thereby controlled in the operation.

A parameter set-up processing part 19 is of a utility species. Upon activation of the system, a variety of data (decision factors 54, user-notified experience factors 55, bypass decision factors 57) are set-up by the parameter set-up processing part 19 in such a manner as shown in detail in FIG. 10. These data are used in the experience decision control processing part described hereinbefore (FIG. 2).

Assuming now that a given key switch 18 (event key) of those provided in the programming unit 4 is depressed by a user, the corresponding key information is inputted to the man-machine control system 21 via the I/O processor interface control system 20, whereupon the experience decision control part 22 is activated. The contents of the processing executed by this experience decision control part 22 has already been described by reference to FIG. 2.

Further, the content of the processing executed by a key manipulation experience factor setting-up processing part 23 corresponds to the processing shown in FIG. 4, the content of the processing executed by a preceding manipulation path experience factor setting-up processing part 24 corresponds to that shown in FIG. 5, and the content of the processing executed by a most frequently executed manipulation path experience factor set up processing part 25 corresponds to that shown in FIG. 6. The results of the processing executed by the experience decision control part 22 are processed by a system control processing part 26 for controlling the robot 1.

Now, description will be made of a mode carried out by the system structurized in the manner described above, by taking as example a manual welding with a forward wire feed.

Figure 11:
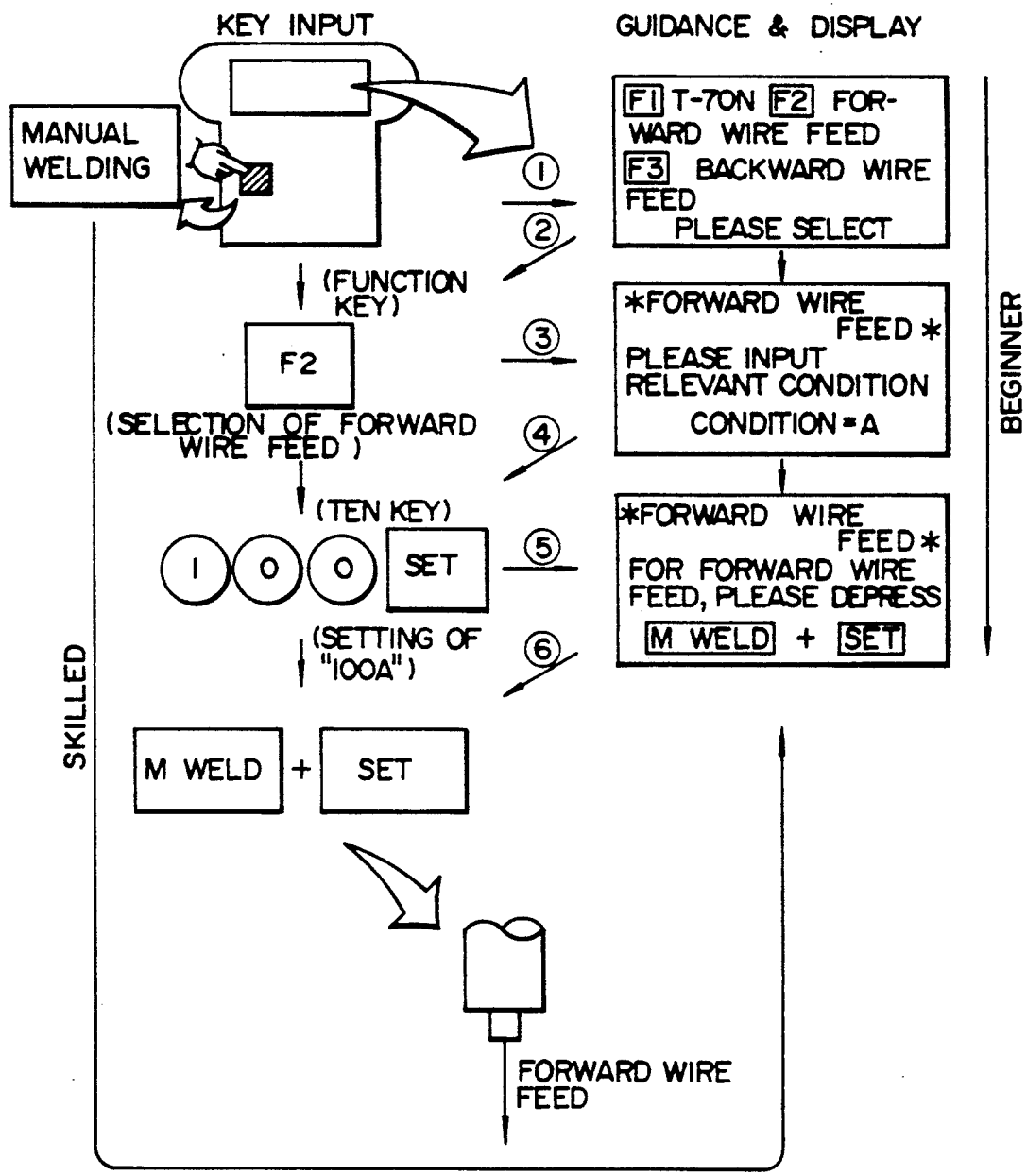
FIG. 11 is a schematic diagram for illustrating a manual welding procedure to which the concept of the invention is applied.

FIG. 11 is a view for illustrating a procedure of key manipulation in this case. Assuming that a beginner operator has depressed a manual weld control key 4g shown in FIG. 8, a display indicated in an upper right block of FIG. 11 is generated. This display presents a guidance for selecting one of function keys F1, F2 and F3 shown in FIG. 8. Since the welding of forward wire feed is currently intended, the function key F2 is selected for depression or actuation, whereon a succeeding display is generated which presents a guidance indication for inputting the conditions for the forward wire feed. In this conjunction, it is again assumed that "100" is inputted in response to the guidance displayed, as shown in FIG. 11. Subsequently, the set key 4i is depressed, whereby the forward feed conditions 100A is fetched. Now, a display presenting a final manipulation guidance indication for performing the manual welding is generated. Thus, by depressing the set key while actuating the manual weld key "M weld", the welding operation is started.

Next, let's assume that the user is a skilled person. In this case, the intermediate key manipulation is automatically omitted through the control based on the experience factor. In other words, when the manual welding control key is depressed, the display presenting the final manipulation guidance for performing the manual welding is immediately generated. Accordingly, by depressing the set key while depressing the manual welding control key, the welding operation is started.

Figure 12:
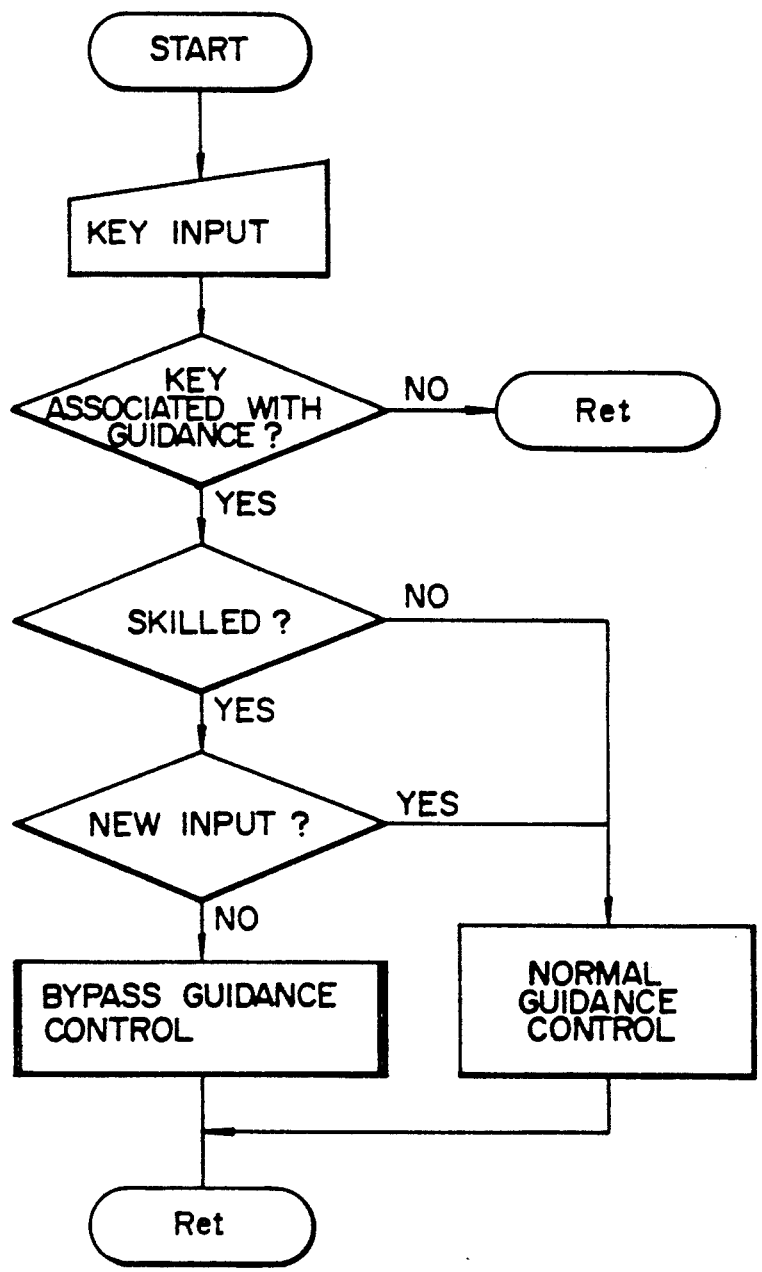
FIGS. 12 and 13 are flow charts showing processings involved in the manual welding shown in FIG. 11.
Figure 13:
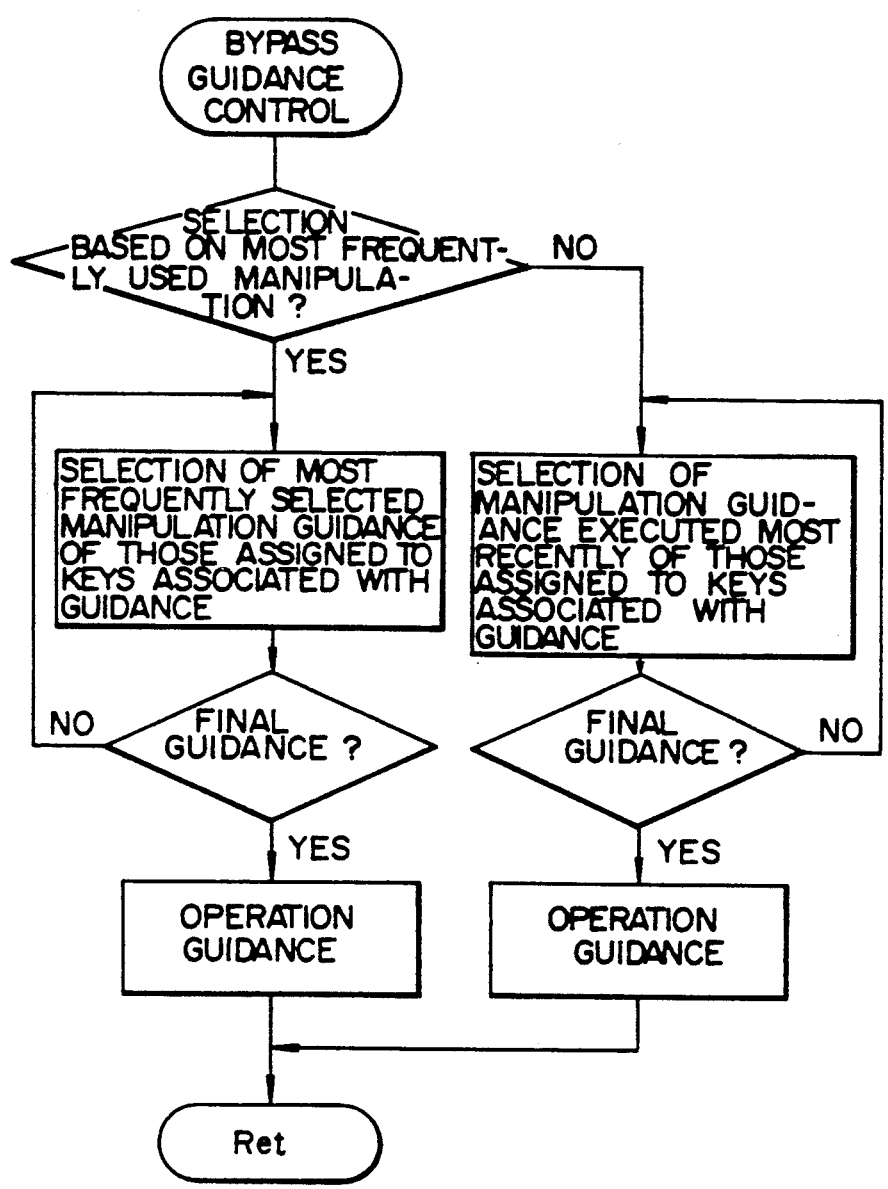

FIG. 12 shows, by way of example, a control flow involved in the manual welding operations described above. As can be seen in the figure, when a key is depressed, decision is made whether or not it is for the guidance. If so, then decision is made whether the user is a skilled operator. Subsequently, it is decided whether the input is novel or not. When this decision results in "NO", the bypass guidance control shown in FIG. 13 is performed.

According to this bypass guidance control, decision is made on the basis of parameters inputted previously as to whether the manipulation guidance for the manipulation path which has been employed a maximal number of times (i.e. the most frequently executed manipulation path) or the manipulation guidance for the manipulation performed most recently (i.e. the preceding manipulation path) is to be selected, wherein the corresponding final manipulation guidance display is generated.

In general, a plurality of paths are intrisically involved between the actuation of the manual welding control key and the generation of the final manipulation guidance display, wherein there exist a plurality of final manipulation guidances. However, in consideration of the fact that the industrial robot once installed is most likely to be so used repeatedly for the same operation. Accordingly, for those skilled in this art, the use of the system can be extremely simplified and facilitated by allowing a particular path to be automatically selected, as in the case of the illustrated embodiment of the invention.

Although the present invention has been described on the assumption that it is applied to an industrial robot, it should be understood that the invention can equally be applied to various machines which are operated similarly to the industrial robot.

What is claimed is:

1. A robot control apparatus equipped with a display unit for displaying at least a guidance indication for key manipulation and event keys, with assigned objectives and functions wherein teaching is performed with the aid of said display unit and said event keys, comprising:
    experience factor storage for storing experience factors indicating levels of skillfulness of operators;
    beginner/skilled person oriented manipulation path selecting unit for selecting either a beginner oriented manipulation path or a skilled person oriented manipulation path on the basis of information stored in said experience factor storage;
    most frequently executed manipulation path storage, provided in association with each of said event keys, for storing the skilled person oriented manipulation path executed most frequently; and
    control unit responsive to the selection of said skilled person oriented manipulation path by said beginner/skilled person oriented manipulation path selecting unit and actuation of the event key for displaying a final manipulation guidance indication of said most frequently executed manipulation path corresponding to said actuated event key.

2. A robot control apparatus according to claim 1, wherein said experience factor is either a factor based on key manipulation skill or a factor set by a user.

3. An industrial robot, comprising:
    a robot body for performing a working operation;
    manipulation guidance indication display for displaying at least a guidance indication for key manipulation; and
    robot control unit connected to said robot body, for teaching goal functions to be executed and performing control operation of said robot body by actuating event keys;

wherein said robot control unit includes:

experience factor storage for storing experience factors indicating levels of skillfulness of operators;

selecting unit for selecting either a beginner oriented manipulation path or a skilled person oriented manipulation path on the basis of information stored in said experience factor storage;

most frequently executed manipulation path storage, provided in association with each of said event keys, for storing the manipulation path executed most frequently;

first control unit responsive to the selection of said skilled person oriented manipulation path by said selecting unit and the actuation of said event key, for initiating display of a final manipulation guidance indication of the most frequently executed manipulation path corresponding to said actuated key; and second control unit for starting operation of said robot body by manipulating a specific event key designated by said final manipulation guidance indication.

4. An industrial robot according to claim 3, wherein said experience factor is either a factor based on key manipulation skill or a factor set by a user.

5. A method of teaching an industrial robot equipped with a manipulation guidance indication display for displaying at least a guidance indication for key manipulation and event keys, with assigned objectives and functions, which are actuated for allowing goal functions to be executed, wherein teaching is performed with the aid of said display and said event keys, comprising the steps of:

storing a manipulation path executed most frequently for each of said event keys;

actuating said event key;

selecting either one of a beginner oriented manipulation path or a skilled person oriented manipulation path of the basis of experience factors indicating levels of skillfulness of operators; and responding to the selection of said skilled person oriented manipulation path and actuation of the event key for displaying a final manipulation guidance indication of said most frequently executed manipulation path corresponding to said actuated event key.

* * * * *